United States Patent [19]

Blumer

[11] Patent Number: 4,703,803
[45] Date of Patent: Nov. 3, 1987

[54] COMPOSITION AND METHOD FOR SLOWLY DISSOLVING SILICEOUS MATERIAL

[75] Inventor: David J. Blumer, Tulsa, Okla.
[73] Assignee: Cities Service Oil & Gas Corporation, Tulsa, Okla.
[21] Appl. No.: 877,973
[22] Filed: Jun. 24, 1986
[51] Int. Cl.$^4$ ............................................. E21B 43/27
[52] U.S. Cl. ..................................... 166/300; 166/307; 252/8.553
[58] Field of Search .................. 252/8.553, 8.551, 79.3; 166/307, 270, 300

[56] References Cited

U.S. PATENT DOCUMENTS

| | | | |
|---|---|---|---|
| 1,990,969 | 2/1935 | Wilson | 166/307 |
| 2,059,459 | 11/1936 | Hund et al. | |
| 2,118,386 | 5/1938 | Swinehart | |
| 3,215,199 | 11/1965 | Dilgren | 166/300 |
| 3,297,090 | 1/1967 | Dilgren | 166/307 |
| 3,307,630 | 3/1967 | Dilgren | 166/307 |
| 3,543,856 | 12/1970 | Knox et al. | 166/281 |
| 3,605,899 | 9/1971 | Tate et al. | 166/300 |
| 3,707,192 | 12/1972 | Goins, Jr. et al. | 166/300 |
| 3,785,866 | 1/1974 | Frey | 252/79.3 X |
| 3,797,574 | 3/1974 | Feuerbacher et al. | 166/274 |
| 3,828,854 | 8/1974 | Templeton et al. | 166/307 |
| 3,868,998 | 3/1975 | Lybarger et al. | 166/278 |
| 3,876,007 | 4/1975 | Christopher | 166/307 |
| 3,889,753 | 6/1975 | Richardson | 166/307 |
| 3,953,340 | 4/1976 | Templeton et al. | |
| 3,986,970 | 10/1976 | Shiga | 252/79.3 |
| 4,056,146 | 11/1977 | Hall | 166/300 |
| 4,089,787 | 5/1978 | Lybarger et al. | |
| 4,136,739 | 1/1979 | Salathiel et al. | 166/300 |
| 4,148,360 | 4/1979 | Watanabe | 166/300 |
| 4,160,483 | 7/1979 | Thomas et al. | 166/307 |

(List continued on next page.)

FOREIGN PATENT DOCUMENTS

| 0092340 | 10/1983 | European Pat. Off. |
| 0137872 | 4/1985 | European Pat. Off. |
| 1590345 | 6/1981 | United Kingdom |
| 2098196 | 11/1982 | United Kingdom |

OTHER PUBLICATIONS

Journal of Petroleum Technology, Aug. 1981, pp. 1491 to 1500.
Hexafluorotitanate Ion in Aqueous Solution at 0° and 25° C., Russian Journal of Physical Chemistry, vol. 46, pp. 1334 to 1336.
Well Design, Drilling and Production, Prentice–Hall, Inc., 1962, Chapter 2, Section 9.2, pp. 538 and 539.
Halliburton Services Publication F-3183 (Revised).
Halliburton Services' publication entitled Chemical Services Technical Data, CS-5073..
Halliburton Services' publication entitled Chemical Services Technical Data, CS-5136.
Publication by Dowell Division of Dow Chemical entitled Dowell Stimulation Materials Manual, Acidizing—Sec. I-D-1, Dec., 1981, pp. 1 and 2.

Primary Examiner—Herbert B. Guynn
Attorney, Agent, or Firm—F. Eugene Logan

[57] ABSTRACT

An acidizing composition and method for slowly dissolving siliceous material by the slow production of very low concentrations of hydrofluoric acid is provided by this invention. The continual generation of very low concentrations of hydrofluoric acid is accomplished by the hydrolysis of hexafluorotitanate-containing compounds. The acidizing composition is particularly useful and advantageous for the solubilization of siliceous clay in or adjacent the pores of subterranean hydrocarbon formations thereby increasing the permeability of said formations. Because of the very low concentration of hydrofluoric acid in the acidizing composition solubilization of siliceous clay deposits is possible at relatively large distances from the point of injection into the formation, for acidizing formations which are too sensitive for more reactive acidizing compositions, for acidizing formations containing chlorite clays, and/or for acidizing formations having an elevated temperature including formation temperatures of 125° C. or higher.

27 Claims, 6 Drawing Figures

U.S. PATENT DOCUMENTS

| | | | |
|---|---|---|---|
| 4,200,154 | 4/1980 | Tate | 166/307 |
| 4,203,492 | 5/1980 | Watanabe | 166/300 |
| 4,240,505 | 12/1980 | Swanson | 166/302 |
| 4,267,887 | 5/1981 | Watanabe | 166/300 |
| 4,304,676 | 12/1981 | Hall . | |
| 4,366,071 | 12/1982 | McLaughlin et al. . | |
| 4,366,072 | 12/1982 | McLaughlin et al. . | |
| 4,366,073 | 12/1982 | McLaughlin et al. . | |
| 4,366,074 | 12/1982 | McLaughlin et al. . | |
| 4,374,739 | 2/1983 | McLaughlin et al. . | |
| 4,393,939 | 7/1983 | Smith et al. | 166/293 |
| 4,418,118 | 11/1983 | Murphey . | |
| 4,447,342 | 5/1984 | Borchardt et al. . | |
| 4,460,483 | 7/1984 | Weaver . | |
| 4,462,718 | 7/1984 | McLaughlin et al. | 405/264 |
| 4,480,694 | 11/1984 | Watanabe | 166/300 |
| 4,497,596 | 2/1985 | Borchardt et al. | 405/263 |
| 4,536,297 | 8/1985 | Loftin et al. . | |
| 4,536,305 | 8/1985 | Borchardt et al. . | |

COMPOSITION AND METHOD FOR SLOWLY DISSOLVING SILICEOUS MATERIAL

BACKGROUND OF THE INVENTION

1. Field of the Invention

This invention pertains to the stimulation of wells to improve the permeability of such wells to the flow of fluids. The invention is especially useful in improving the flow of hydrocarbons from wells which have suffered from formation damage due to clay deposits.

2. Description of the Prior Art

It is well known that oil production in siliceous subterranean formations, over the useful life of a well, usually decreases with time. To reestablish a higher flow of oil, one of the first methods usually employed is pumping. Frequently, however, after a period of time, even pumping will not make the well economical. Unfortunately in many wells such flow reduction occurs long before the oil, or other fluid in the reservoir reached by the wellbore, has become depleted. Low permeability frequently results from the deposition of clay and other finely divided material in the pore structure or flow passages of the formation. Clay particles, capable of forming such undesirable deposits, generally exist throughout the formation and are carried by the oil and deposited in the flow passages leading to the wellbore. Formation damage can also be caused by the swelling of the clay upon contact with foreign liquids injected for well development or stimulation purposes. Formation damage of the above types is often referred to as clay deposits, clay dispersions, particle plugging, clay swelling, etc., which hereinafter will simply be referred to collectively as "pore deposits."

It is known that pore deposits can be solubilized more or less by treatment with mineral acid solutions, for example, hydrochloric acid and hydrofluoric acid. Aqueous solutions containing about 2 to 6 weight percent hydrofluoric acid and 5 to 15 weight percent hydrochloric acid, sometimes referred to as "mud acids" have been used to treat damaged formations in hopes of restoring to the formation its initial permeability. Mud acids have also been used to treat formations which are naturally tight.

Unfortunately, hydrochloric acid is usually not effective in solubilizing the more tenuous pore deposits such as those deposits that are mainly siliceous in composition. By the term "siliceous" as used herein is meant silica and/or silicate. By the term "siliceous material" as used herein is meant silica-containing and/or silicate-containing materials. Examples of siliceous materials are sandstone and certain clays. Non-limiting example of clays which are silicates, usually aluminosilicates are attapulgite, bentonite, chlorite, halloysite, illite, kaolinite, montmorillonite, and various mixtures of the aforementioned substances. It is known that hydrofluoric acid will solubilize siliceous material readily; however, because of its high reactivity hydrofluoric acid, unmixed with other mineral acids such as hydrochloric acid, generally is not used to increase oil production. Other serious problems also exist with the use of hydrofluoric acid. For example, since the rate of reaction of hydrofluoric acid with siliceous materials is very rapid, most of the acid is spent within a zone of about one or two feet or less radially from the wellbore. In formations having high formation temperatures the acid becomes spent at even shorter distances from the wellbore thereby causing the acidizing operation to be even less effective.

Since the mineral content of the matrix of many formations is usually sandstone or silica or a similar siliceous material, hydrofluoric acid can dissolve the matrix itself as well as the undesirable pore deposits in the matrix. As a consequence hydrofluoric acid can cause permanent damage to the formation by the dissolving of the pore structure or matrix itself, or by allowing the precipitation of reaction products and/or creation of fines within the pores of the formation. To prevent permanent damage from occurring the concentration of hydrofluoric acid is usually adjusted so that no more than minor damage to the formation can occur. As a consequence, clay deposits distant from the wellbore do not come in contact with hydrofluoric acid-containing acidizing compositions generally used for dissolving siliceous matter and thus such distant deposits are not dissolved. It is well recognized in the oil producing industry that it is difficult to dissolve only the pore deposits and especially those deposits more than two feet from the wellbore. Nonetheless even utilizing hydrofluoric acid concentrations as low as 0.1%, permanent damage to some formations can occur.

As mentioned earlier another problem associated with acidizing with formations containing hydrofluoric acid is that since the cleaned-out area is usually within a two-foot radius or less of the wellbore, loss of permeability can reoccur within a very short period of time after the treated well is put back on production since the deeper pore deposits are not removed. Thus, it is generally accepted that if deep pore deposits are to be solubilized by hydrofluoric acid, a large quantity and flow rate of acid must be used and since the acid can react with all siliceous material, there is a very high risk that permanent damage will result to the formation.

For these reasons, there have been various attempts to slow up the rate of reaction of hydrofluoric acid so that it can penetrate deeper into the formation and solubilize deeper pore deposits without causing serious damage to the formation adjacent to the wellbore. Unfortunately, many of these attempts, as will be described and further discussed below, still fall short of effectively increasing the permeability of the formation in those zones much farther than the usual two feet from the wellbore.

U.S. Pat. No. 990,969 discloses a well stimulation process which produces hydrofluoric acid directly in the subterranean formation. In particular, a quantity of hydrochloric acid is first pumped into the well which is then followed by a quantity of sodium fluoride. The hydrochloric acid and the sodium fluoride react in the formation to produce hydrofluoric acid and sodium chloride. The hydrofluoric acid reacts with the silica material in the pores to dissolve it thereby increasing the permeability of the formation to the flow of oil. The patentee alleges that in his process the hydrofluoric acid is not required to be handled at the surface or continuously in the tubing of the wellbore, but rather produced from precursor reagents within the subterranean formation itself. The "alternate and separate slug" or "two slug" method as disclosed in U.S. Pat. No. 1,990,969 also has disadvantages. First damage to the wellbore can occur because at the interface of the alternate slugs, hydrofluoric acid can be generated and can attack the well tubing itself, thereby decreasing the useful life of such tubing. Secondly, mixing of the reactants within the porous formation is not always uniform and hence not always complete, thereby causing some regions to have high hydrochloric acid concentrations and other regions to have high sodium fluoride concentration. Such regions will not be exposed to effective hydrofluoric acid concentrations and consequently will be largely unaffected by the treatment. Thirdly, the permeability tends to be increased only in a region very close to the wellbore due to the high reactivity of the treating solution. Consequently, deep pore deposits will not be solubilized to the extent desired. Thus, any improvement in oil production will be most likely for only a relatively small period of time.

Others have attempted to improve the distribution of the reactants into the formation over a greater distance by slowing the rate of reaction between hydrofluoric acid and the formation. U.S. Pat. No. 3,889,753 discloses a well stimulation method for dissolving silica or clay around the wellbore. The method involves contacting the siliceous material with an aqueous solution of a fluoride salt, a weak acid, and a weak acid salt in proportions that form in situ a significant but low concentration of hydrogen fluoride. However, while such acidizing mixtures may provide some improvement they still are too reactive to reach and solubilize deep pore deposits.

Ostensibly in order to overcome this difficulty some have returned to the alternate but separate slugs approach discussed earlier. U.S. Pat. No. 4,056,146 discloses a well stimulation method in which alternate slugs of hydrochloric acid and ammonium bifluoride or ammonium fluoride, or mixtures thereof, are alternately and separately introduced into the wellbore. The reagents react and produce hydrofluoric acid. Unfortunately these reagents still react too fast and the hydrofluoric acid produced is spent before it can penetrate deeply into the formation.

In order to obtain deeper penetration of the reagents into the formation, U.S. Pat. No. 4,136,739 varied the injection sequence by injecting, between the two alternate and separate reagent slugs, a hydrocarbon liquid such as diesel oil. In particular, an aqueous solution of an ammonium salt of hydrofluoric acid such as ammonium fluoride is injected in a first slug into the formation. This is then followed by a separate slug of diesel oil, which in turn is followed by a third and separate slug of hydrochloric acid. The patentee contends that in this way hydrofluoric acid is generated at a deeper distance from the wellbore than with the usual two slug method. The problem with this method is that mixing of the reagents in situ, because of the interdisposed diesel oil, becomes even more difficult and less effective. Furthermore, the reactants, when they are mixed, react quickly and produce a relative high concentration of hydrofluoric acid which is too reactive to penetrate deeply into the formation.

In many of the alternate and separate slug methods, the steps are repeated a number of times in order to better distribute the reagents on a more uniform basis into the formation. This switching back and forth can lead to operator error which in turn can result in regions in the formation having a higher concentration of one reagent and little, if any, of the other reagent, thereby providing no solubilization of the pore deposits in such regions. Unfortunately, the difficulty with the alternate and separate slug methods is that it is difficult to provide an equal distribution of each reagent to all parts of the formation zone unless the amount of each slug is very small. As can be appreciated, the smaller the slug amount the greater the number of slug cycles required to introduce the required quantity of reagents into the formation. As slug amount is decreased and the number of cycles increased, the more apt the reagents are to react and form hydrofluoric acid before penetrating deeply into the formation thereby increasing the possibility of both formation damage and well casing damage, and producing little, if any, solubilization of the deeper pore deposits.

The difficulty of mixing reagents in situ was avoided in U.S. Pat. No. 418,118 by mixing the acidizing composition at the surface prior to injecting into the formation. The reaction rate of hydrofluoric acid on silica and silicates is said to be retarded. The method relies on the reaction of a mineral acid other than hydrofluoric acid with certain fluoride compounds to produce hydrofluoric acid. The fluoride compounds disclosed have the formula:

$$(T^{+3})_n(M^{+1})_z(F^a)_y$$

and include their hydrates. The cation T is zirconium, cobalt or chromium. M is either hydrogen or ammonium, and z is 0 to 4. The constants satisfy the formula:

$$3n+z=ay.$$

The only fluoride compounds disclosed are chromium fluoride, cobalt fluoride, ammonium zirconium hexafluoride or $(NH_4)_2ZrF_6$, and hydrogen zirconium hexafluoride or $H_2Zr_4F_6$. In order to produce hydrofluoric acid it is taught that sufficient mineral acid, other than hydrofluoric acid, is required to produce an acidic composition with a pH no greater than 2. It is further taught that the actual pH is ordinarily much less than 2 and is often expressed in negative values. It is stressed that the only real limitation on the operability with respect to acidity caused by the mineral acid is the upper pH limit of 2 and that this can be achieved with an acid (ostensibly a mineral acid other than hydrofluoric acid) concentration of about 0.1 percent acid by weight of acidic composition. This method has the disadvantage of requiring a reaction between a mineral acid and a fluoride compound to produce hydrofluoric acid while requiring a strongly acidic solution since the upper limit of the pH is 2 and ostensibly in actual practice a pH much less than 2 or even negative values must be utilized if the treatment is to have any real effect on increasing the permeability of the formation.

Another known method depends upon the hydrolysis of fluoboric acid ($HBF_4$) to produce hydrofluoric acid in situ in the formation. While some improvement in dissolving deeper pore deposits may occur in some subterranean formations the reaction rate is still too high for the more sensitive formations; see Journal of Petroleum Technology, August 1981, pages 1491 to 1500.

In all of these prior art methods, the reactants are still ostensibly too reactive to penetrate deeply into the formation and solubilize the deeper pore deposits. Accordingly, there remains a need for a process which retards the rate of reaction of hydrofluoric acid in the formation but at the same time provides sufficient hydrofluoric acid to the various parts of the formation without a dependence on mixing of the reagents within the formation as the hydrofluoric acid is consumed. What is therefore needed is to have a very small amount of the reactant, hydrofluoric acid, present at all times without the need to rely on its formation in situ by the mixing of alternate and separate slugs of precursors, or even by the mixing within a single slug of reagents the interreaction of which might be altered by mineral matter and/or brine in the formation. In general, it is believed that the prior art acidizing solutions utilizing hydrofluoric acid have too high a reactivity and hydrofluoric acid concentration to effect solubilization of the deeper pore deposits. The present invention offers a solution to these problems by the very slow in situ formation of very small amounts of hydrofluoric acid, by hydroysis of a fluoride compound without the necessity to react the fluoride compound with a mineral acid or any other reagent thereby minimizing the uncontrollable effect of varying mineral matter and brine encountered in the subterranean formation being acidized. The present invention therefore allows deeper penetration of the treating fluid into the formation to solubilize deeper pore deposits without causing significant damage to the matrix structure of the formation.

SUMMARY OF THE INVENTION

Injection of one or a series of acidic solutions down a well and into a subterranean formation with the objective of improving the permeability of the formation and hence the flow rate of fluid, for example petroleum, natural gas, water, or other fluids into or out of the well is commonly termed matrix acid stimulation. Frequently concentrated solutions, e.g., 5 to 30% hydrochloric acid, or mixtures such as 12% hydrochloric acid 3% hydrofluoric acid termed mud acid are used to stimulate the formation. Unfortunately the use of these concentrated acid solutions can cause reduction in the permeability of certain subterranean formations for a variety of reasons, including very rapid reaction with the formation leading to reaction product precipitation and release of fine particles. For such sensitive formations, which include high clay containing rock, a more gentle acidizing agent is required.

This invention comprises the slow hydrolysis of hexafluorotitanate anion or $TiF_6^{--}$, to produce low concentrations of hydrofluoric acid (HF) which is then used to slowly dissolve siliceous matter which restricts the flow of fluids in the formation. This invention also comprises the slow hydrolysis of hexafluorotitanate anion-containing compound without the necessity of reacting the hexafluorotitanate with an acid, including an acid other than HF, to produce HF. The equilibrium constant for the hydrolysis of hexafluorotitanate anion to HF is about $1.4 \times 10^{-6}$, see Kinetics of the Hydrolysis of the Hexafluorotitanate Ion in Aqueous Solution of 0° and 25° C., Russian J. Phy. Chem., Vol. 46, pages 1334–1336, which is hereby incorporated herein by reference. Therefore the concentration of HF in solution at equilibrium is very small. The kinetics of the hydrolysis of hexafluorotitanate anion are also slow about 1 to 2 hours at 25° C. This invention comprises the reaction of an aqueous solution containing hexafluorotitanate anions with siliceous materials to slowly dissolve such materials. When subterranean formations containing siliceous materials are contacted with the acidizing solutions of this invention the very slowly produced hydrofluoric acid, because of its very low concentration, will react slowly with the formation, and preferentially with the more reactive siliceous clay deposits in or adjacent the pores of the formation. The acidizing solution therefore will travel deeply into the formation thereby improving the permeability of the formation for considerably longer distances from the wellbore than could be achieved by more concentrated hydrofluoric acid solutions.

Accordingly, in accordance with the practice of the present invention, there is provided a composition and method for slowly dissolving siliceous material comprising forming an aqueous acidizing composition comprising (i.) water and (ii.) a first substance selected from the group consisting of hexa-fluorotitanate-containing compounds, hydrates of such compounds, and mixtures thereof which are operable for producing without the presence of an acid in said aqueous composition other than hydrofluoric acid, hydrofluoric acid by reaction or hydrolysis of hexafluorotitanate anions produced from the first substance with water, wherein the concentration of the first substance in the aqueous composition is from about 0.0001 molar to about the solubility limit of the first substance in water. The method further comprises contacting siliceous material with the aqueous composition to slowly dissolve the siliceous material. The method is particularly useful where the siliceous material is contained in a subterranean formation, and especially where the siliceous material is siliceous mineral matter adjacent to the walls of, or in, the pores of the subterranean formation. In one embodiment the first substance is selected from the group consisting of ammonium fluotitanate or $(NH_4)_2TiF_6$, sodium fluotitanate or $Na_2TiF_6$, hydrates of ammonium fluotitanate, hydrates of sodium fluotitanate, and mixtures thereof. The first substance hydrolyzes in the aqueous acidizing composition to produce the hexafluorotitanate anion which then hydrolyzes by the following reaction:

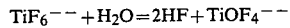

$$TiF_6^{--} + H_2O = 2HF + TiOF_4^{--}$$

In one embodiment the concentration of the first substance used to form the aqueous acidizing composition is from about 0.01 to about 1.3 molar and has a pH greater than 2. In another embodiment the concentration of the first substance used to form the aqueous acidizing composition is from about 0.05 to about 0.75 molar and has a pH of at least about 2.2. In still another embodiment the concentration of the first substance is from about 0.1 molar to about 0.5 molar. In still another embodiment the pH of the aqueous solution is about 2.6 or higher. In yet another embodiment the pH of the aqueous solution is from about 2.2 to about 3.8. In one embodiment the pH of the aqueous solution is from about 2.6 to about 3.7. In another embodiment the pH of the aqueous solution is from about 2.6 to about 3.5.

In a subterranean formation which contains siliceous materials, usually both the pore deposits and the matrix of the formation contain siliceous substances. Fortunately the siliceous material which comprises the pore deposits is usually more easily solubilized than the siliceous material which comprises the matrix. One embodiment of this invention comprises injecting the above-described aqueous acidizing compositions of this invention into a wellbore, the mixture being operative for slowly dissolving the more readily dissolvable siliceous material as found adjacent to or in the pores of the subterranean formation. In a preferred embodiment of this invention the mixture is substantially free of mineral acid other than hydrofluoric acid since a mineral acid is not required by this invention to produce hydrofluoric acid from the hexafluorotitanate-containing compounds by hydrolysis. However, it is not necessary for the acidizing composition to be free of a mineral or organic acid since the hexafluorotitanate-containing compound of this invention is operable for producing HF by hydrolysis whether or not an acid is present and reaction of the hexafluorotitanate with an acid (e.g. an acid other than HF) is not required to produce HF by hydrolysis of the hexafluorotitanate of this invention. The method further comprises allowing the mixture to flow deeply into the subterranean formation away from the wellbore and allowing the mixture to react with the siliceous material which is responsible for the low permeability of the formation and to slowly dissolve such siliceous material, thereby increasing the permeability of the formation over a greater distance from the wellbore than the permeability of the more distant parts of the formation would be increased by acidizing with compositions having higher hydrofluoric acid concentration. It is to be understood that the increased permeability is achieved by the slow in situ hydrolysis of the hexafluorotitanate-containing compound and by slowly producing a very low concentration of hydrofluoric acid from the hexafluorotitanate-containing compound.

The method is especially useful for subterranean zones which are hydrocarbon producing zones such as oil and natural gas producing zones.

In one embodiment of this invention the formation is treated with an effective amount of a sequestering or chelating agent to prevent the production of precipitates in the formation. Such treatments with a sequestering agent can be as a separate step before and/or after the step of acidizing the formation with the hexafluorotitanate-containing compounds of this invention. Alternately the sequestering agent can be combined in the same step with the hexafluorotitanate-containing compounds of this invention. Citrate sequestering agents are effective for preventing precipitation of reaction products, especially insoluble aluminum salts and iron-containing compounds. The ammonium salt of citric acid is preferred over the sodium salt since the former lessens the chance of insoluble sodium compounds from being formed. It should be understood, however, that the purpose of the sequestering agent is to prevent the production of detrimental precipitates in the formation and not for reacting with the hexafluorotitanate-containing compounds of this invention for purposes of forming HF by said reaction.

In one embodiment the concentration of citrate ion is from about 0.01 to about 1 molar. In another embodiment the concentrate of the citrate ion is from about 0.05 to about 0.5 molar and preferably from about 0.1 to about 0.2 molar. In compositions containing citric acid, the pH of the acidizing composition may be as low as about 2.2 whereas if a citrate is used the pH of the acidizing composition may be as low as about 2.6. Although citric acid is usually cheaper than a citrate, and sodium citrate is usually cheaper than ammonium citrate, ammonium citrate is preferred in very sensitive formations because it reduces the formation of sodium-containing precipitates and does not lower the pH of the acidizing composition as much as citric acid.

The method is particularly useful where the siliceous material in the subterranean zone comprises clay. Non-limiting examples of clay minerals for which this method can be advantageously applied is attapulgite, bentonite, chlorite, halloysite, illite, kaolinite, montmorillonite, a mixed-layer of the aforementioned clays, and various mixtures thereof. Furthermore, because of the very small concentration of hydrofluoric acid provided by this invention, the method can be employed in formations having elevated temperatures without incurring commercially significant damage to the formation. For example the acidizing composition and method of this invention can be used in siliceous material having an elevated temperature between 65° C. and 125° C. or higher without causing significant damage to the strength of the siliceous material. This means that subterranean hydrocarbon-producing formations having elevated temperatures can be acidized using the composition and method of this invention without serious reduction in the compressive strength of the treated formation. This invention therefore improves the permeability of a formation over greater distances from the wellbore than acidizing systems employing acidizing formulations having a pH of 2 or lower which can cause serious damage in some formations.

This invention is particularly useful in formations which are too sensitive for acidizing with other acidizing compositions.

DESCRIPTION OF THE PREFERRED EMBODIMENTS

Seven small ground samples of Wyoming bentonite, ground and screened through no. 200 mesh, U.S. Sieve Series were reacted at 25° C. over several periods of time with the following aqueous acidizing solutions:
(1) 0.1M ammonium bifluoride ($NH_4HF_2$)
(2) 0.1M hydrofluoric acid (HF)
(3) 0.1M sodium monofluorophosphate ($Na_2PO_2F$) with the solution pH adjusted to 4
(4) 0.05M ammonium fluoride ($NH_4F$) - 0.05 M HF mixture
(5) 0.1M fluoboric acid ($HBF_4$)
(6) 0.1M $Na_2PO_2F$ with the solution pH adjusted to 7
(7) 0.05M sodium fluotitanate ($Na_2TiF_6$)

Figure 1:
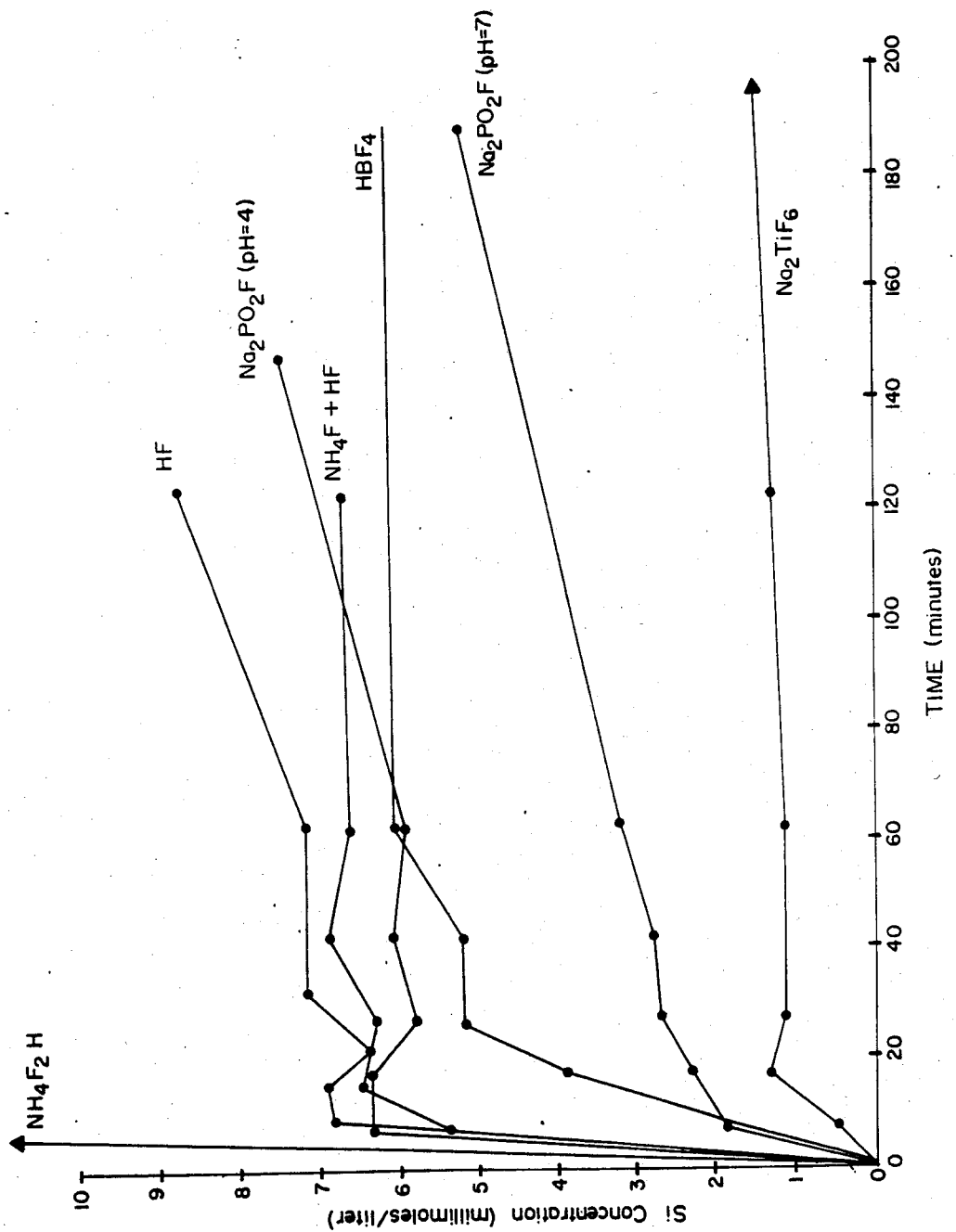
FIG. 1 is a graphical representation of the rate of dissolution of bentonite in various acidizing compositions compared to the sodium fluotitanate acidizing composition of this invention.

The amount of silicon dissolved as a function of reaction time for the seven experiments is shown in FIG. 1. The data presented in FIG. 1 shows that the sodium fluotitanate solution dissolved bentonite much more slowly than the other acidizing formulations.

A sample of the Wyoming bentonite was analyzed and found to have the following cation content, expressed as %, ppm or ppb by weight of the total cation content in the oxide state,: 2.33% Na, 1.21% K, 1.06% Ca, 1.80% Mg, 3.87% Fe, 18.21 Al, 66.90% Si, 0.263% Ti, 0.046% P, 0.076% Ba and 0.020% Mn, and expressed as parts per million (ppm): 274 ppm Sr, <250 ppm V,
13 ppm Cr, 8 ppm Co, 11 ppm Ni, 8 ppm Cu, <50 ppm Mo, 26 ppm Pb, 62 ppm Zn, <5 ppm Cd, <2 ppm Ag, <4 ppp Au, <25 ppm As, <30 ppm Sb, <100 ppm Bi, <2500 ppm U, <50 ppm Te, <5 ppm Sn, <1200 ppm W, 23 ppm Li, 2.1 ppm Be, <400 ppm B, 125 ppm Zr, 39 ppm La, 65 ppm Ce, <150 ppm Th, and expressed as parts per billion (ppb): 20 ppb Hg; which when totalled amounts to 95.788% of the cation content in the oxide state of the Wyoming bentonite sample.

Figure 2:
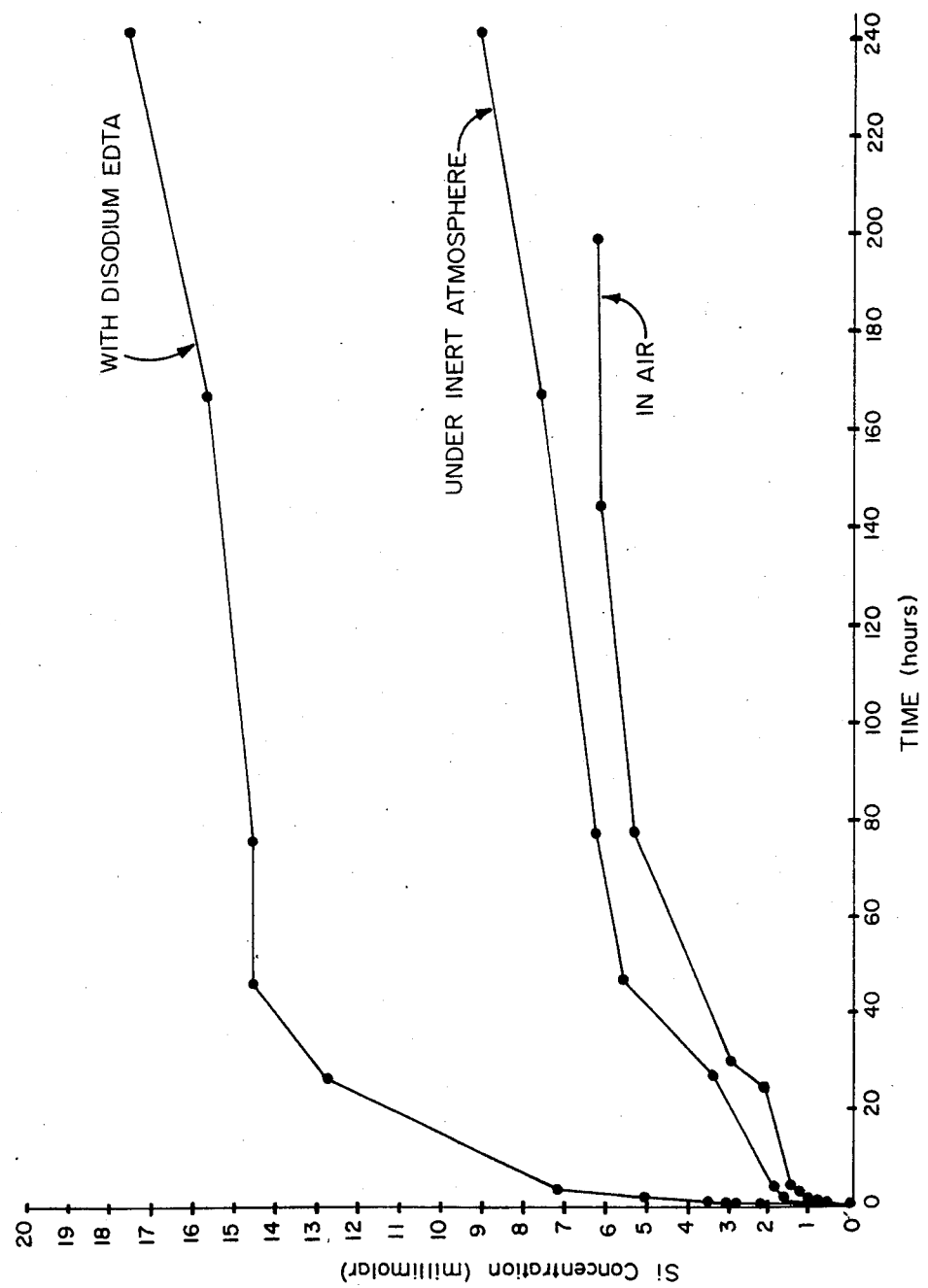
FIG. 2 is a graphical comparison of the rate of dissolution of clay from siliceous rock using 0.05M sodium fluotitanate where the rock is prereacted with a sequestering agent and where the reaction is conducted under an inert atmosphere.

It has also been found that by treating certain types of siliceous rock with a sequestering or chelating agent before acidizing with the hexafluorotitanate-containing acidizing solution greatly improves the amount of clay removed from the rock. FIG. 2 shows that a 0.05M sodium fluotitanate acidizing solution of this invention dissolves more clays from Talara Zapotal rock when the rock is prereacted with disodium ethylenediamine tetraacetic acid (disodium EDTA) before the rock is reacted with the fluotitanate solution. This is an unexpected and surprising result since it is not believed that pretreatment with sequestering agents improves the clay removing capabilities of other acidizing compositions. Treatment of the rock with hexafluorotitanate-containing compositions under an inert atmosphere was also shown to increase the amount of silicon dissolved over that experience when acidizing in air, but the increase was not as great as that experienced by pretreatment of the rock with EDTA which exhibited silica solubilization over 2.5 times the amount experienced when the control sample was acidized in air.

The Talara Zapotal rock from the Talara, Peru, oil field formation was assayed and found to contain by weight 2% Na, 4% Mg, 17% Al, 64% Si, 3% K, 2% Ca, 2% Ti and 6% Fe. A mineralogical analysis indicated that the rock was by weight 44% plagioclase, 20% quartz, 16% feldspar, 8% illite, 6% chlorite clay, 4% kaolinite and 2% analcime.

Accordingly one embodiment of this invention further comprises reacting the siliceous material with a sequestering or chelating agent so that acidizing with the hexafluorotitanate-containing acidizing compositions of this invention will result in improved solubility of clay contained in the siliceous material. Reacting the siliceous material with a sequestering agent can be carried out as a separate step prior to the acidizing step or combined with the acidizing step. In one embodiment the sequestering agent is selected from the group consisting of citrate ion-containing substances, EDTA and mixtures thereof. In a still further embodiment the siliceous material is reacted with a sequestering agent after the acidizing step to prevent the precipitate of reaction products produced by the acidizing step thereby improving the stability of the acidized formation. In another embodiment of this invention the siliceous material is subjected to an inert environment before acidizing. In a still further embodiment of this invention, a subterranean formation is first subjected to an inert gas, for example nitrogen, prior to acidizing the formation. While not wishing to be bound by theory, it is believed that such inerting or sequestering treatments prevent the iron compounds of the siliceous material from being acidized by the acidizing compositions of this invention and thereby allow the acidizing composition to dissolve more clay.

Figure 3:
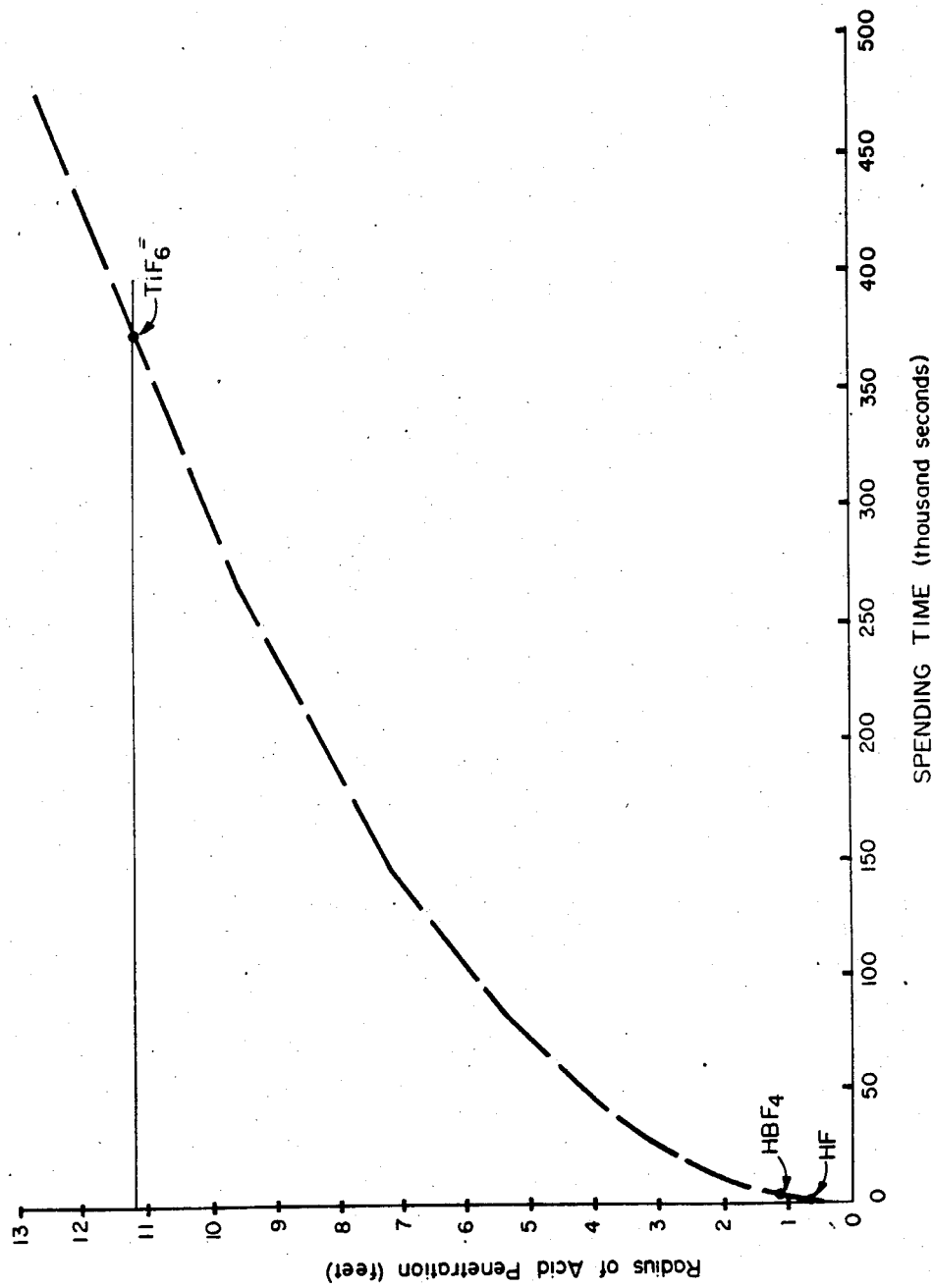
FIG. 3 is a graphical representation of depth of penetration of the reactive acidizing compositions of this invention as compared to hydrofluoric acid and fluoboric acid.

Based on experimental solubilization data and a computer simulated acidizing program, the extent of penetration of the reactive acidizing solution from the wellbore into a Wyoming bentonite-containing formation was calculated for 0.1M HF, 0.1M HBF$_4$ and 0.05M hexafluorotitanate containing acidizing solutions. The calculated results based upon the model program disclosed in Chapter 9, section 9.2, pages 538 to 539 of WELL DESIGN, DRILLING AND PRODUCTION, Prentice-Hall, Inc., which is hereby incorporated herein by reference, are shown in FIG. 3. As can be seen in FIG. 3 the penetration of reactive acidizing composition away from the wellbore is far greater for hexafluorotitanate-containing compositions than for HF and HBF$_4$ solutions. For example, the calculated penetration of the HF solution is only about 0.6 feet and the HBF$_4$ solution about 1.2 feet while the sodium fluotitanate is over 11 feet. This calculation was based on the use of a 0.05M sodium fluotitanate acidizing solution conducted at 25° C. Clay stabilization agents can also be used to stabilize ion exchange sites in the mineral matter or clay in the formation. The formation can be contacted with a clay stabilization agent before, or after, or both before and after contacting the formation with the first substance or fluotitanate-containing aqueous composition. Preferably the clay stabilization agent is an aqueous mixture containing a quaternary amine and ammonium chloride. Preferably the quaternary amine is a polymeric quaternary amine. The clay stabilization agent attaches to the ion exchange sites near the surface of the clay particles and prevents the clays from swelling and preferably also forms bridges or linkages with the clay thereby preventing clay particles from breaking off during the acidification step or subsequent oil producing step. The clay stabilization agent keeps the clay in place and reduces formation damage caused by clay swelling, fine particle migration and reprecipitation of fine material.

Preferably ammonium chloride is used with both the clay stabilization agent and the fluotitanate. The purpose of the ammonium chloride is to assist both the clay stabilization agent and the fluotitanate by maintaining the salts which are formed in the solubilized state. Although sodium or potassium chloride can also be used with the stabilization agent or fluotitanate, ammonium chloride is preferred because of the higher solubility of ammonium salts over sodium or potassium salts.

EXAMPLE 1

Low oil recovery from the Talara Field, Peru, was attributed to its very low formation permeability which was determined to range from 0.1 to 5 md with an average of 1 md. Conventional acid stimulation using 3% HF/12% HCl (mud acid) and 15% HCl resulted in failure. Accordingly the formation is considered a good candidate for stimulation using the acidizing compositions and method of this invention. Laboratory data produced from core flow experiments with Talara Zapotal cores demonstrated about 300% permeability improvement as a result of an acidizing program utilizing this invention. The first test utilized an acidizing sequence consisting of the following five steps which are referred to in FIG. 4 and described below. Examples of clay stabilization agents useful in this process are water soluble quaternary ammonium salts such as tetramethylammonium chloride as disclosed in U.S. Pat. No. 3,797,574, or organic cationic or polycationic polymers or copolymers such as quaternary polymers with nitrogen or phosphorous or trivalent or tertiary sulfur such as disclosed in U.S. Pat. Nos. 4,393,939, or 4,366,071, or 4,366,072, or 4,366,073, or 4,366,074, or 4,374,739, or 4,447,342, or 4,366,073, or 4,462,718, or British Patent Specification No. 1,590,345, or U.K. Patent Application GB No. 2,098,196 A, or European Patent application publication No. 0,092,340, or polycationic polymers and copolymer containing two or three quaternary ammonium moieties such as those disclosed in U.S. Pat. Nos. 4,497,596 or 4,536,305, which aforementioned U.S. and foreign patents and foreign patent applications are hereby incorporated herein by reference to any extent deemed necessary for any purpose. Other examples of clay stabilization agents useful in this process are water soluble organic acid salt or mixture of salts having the formula

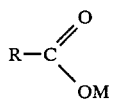

such as those disclosed in U.S. Pat. No. 4,536,297 or European Patent Application publication No. 0,137,872, or aqueous chlorides such as ammonium chloride as disclosed in U.S. Pat. No. 3,543,856, or inorganic polycationic polymers such as zirconyl chloride or aluminum hydroxy chloride, or water soluble alkali metal halides, alkaline earth metal halides or ammonium halide, which aforementioned U.S. and foreign patent applications are hereby incorporated herein by reference to any extent deemed necessary for any purpose.

Figure 4:
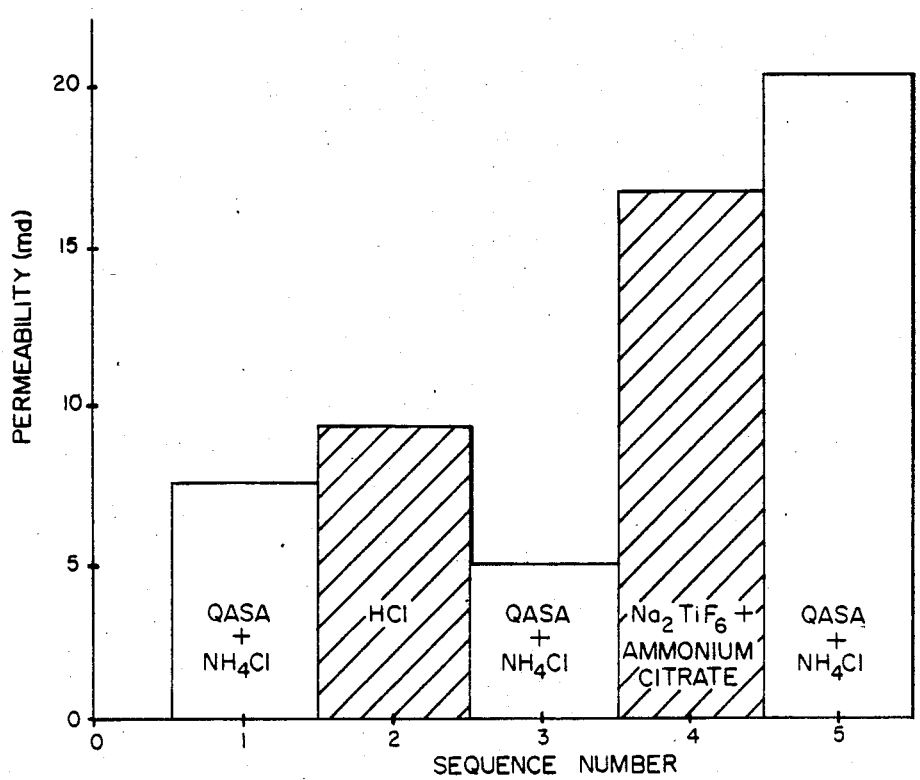
FIG. 4 is a diagram showing the permeability in a core sample after each step of a five step sequential treatment utilizing a 0.2M sodium fluotitanate acidizing solution.
Figure 5:
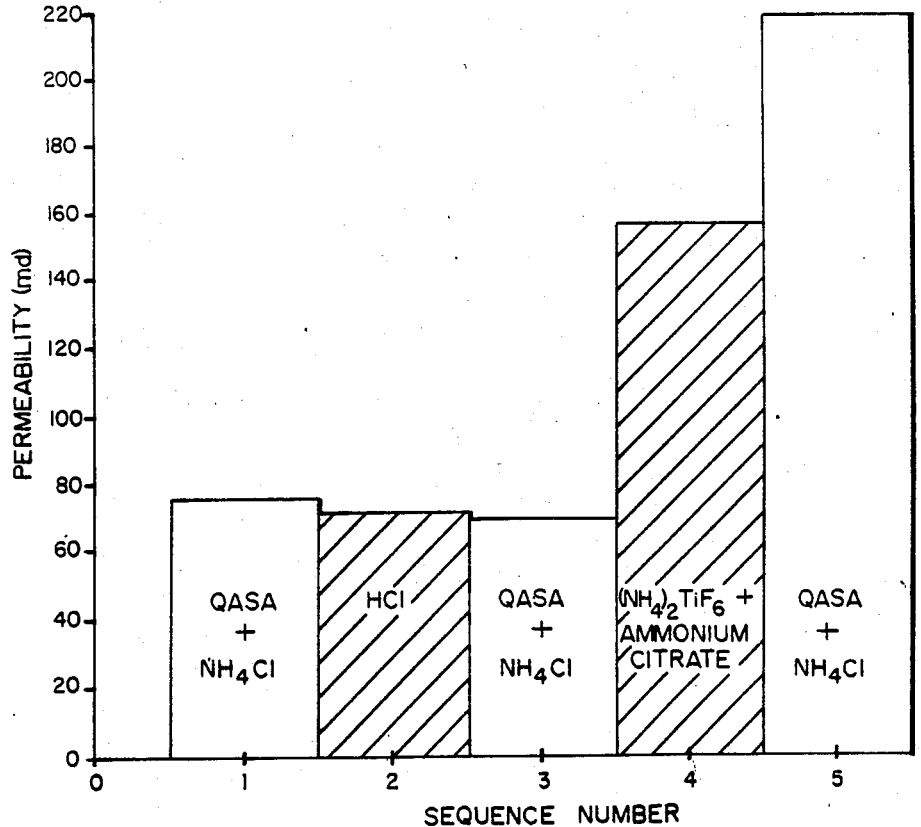
FIG. 5 is another diagram showing the permeability of a core sample which contained 7% $CaCO_3$ after each step of a five step sequential treatment utilizing a 0.1M ammonium fluotitanate acidizing solution.
Figure 6:
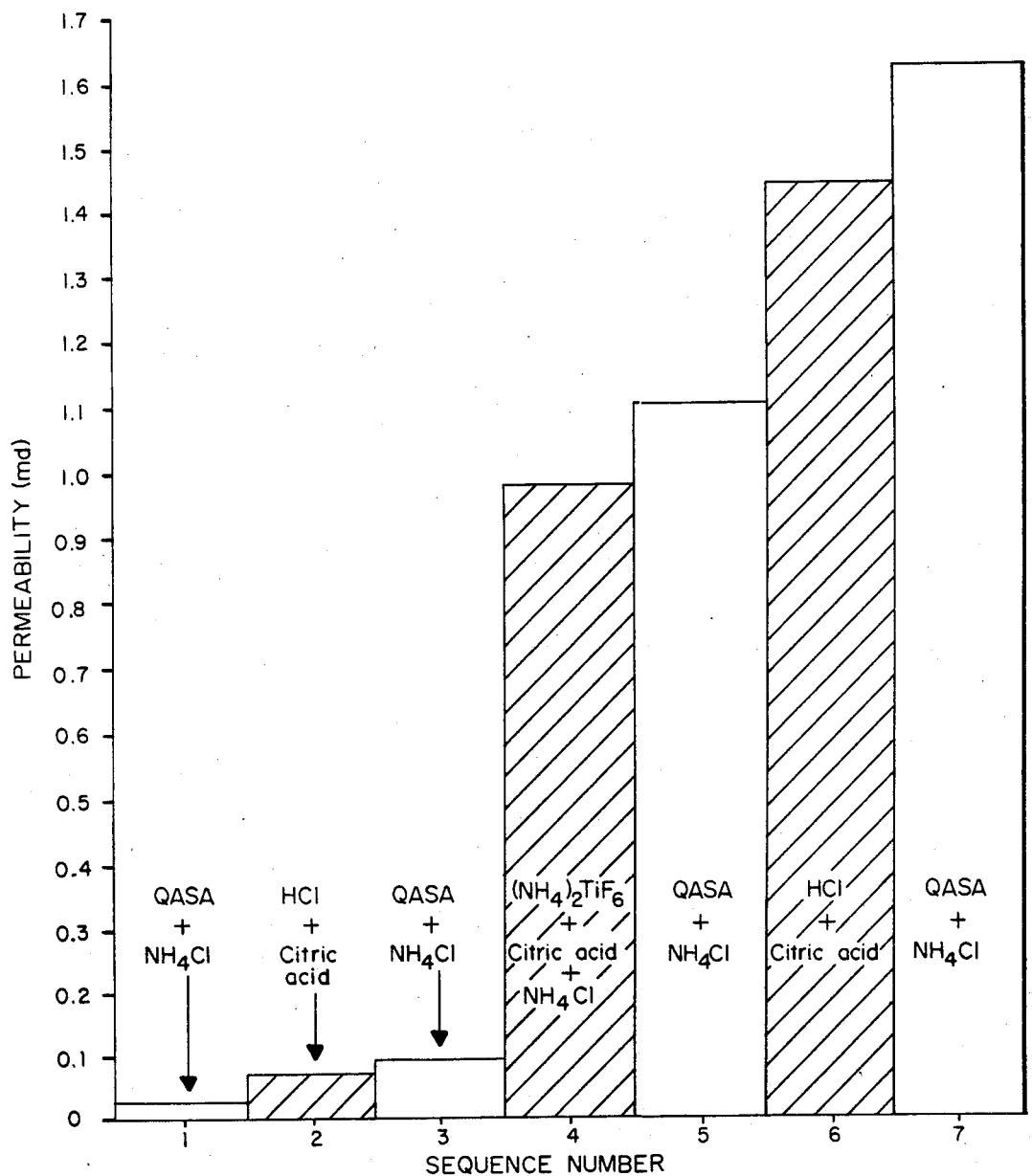
FIG. 6 is a graph showing the permeability of a Somatito core sample after each step of a seven step sequential treatment utilizing a 0.1M ammonium fluotitanate acidizing solution.

The clay stabilization agent used in the experiments represented by FIGS. 4, 5 and 6 is a polymeric quaternary amine stabilization agent sold by Halliburton Services under the trademark CLA-STA II. However it is to be understood that other clay stabilization agents can be used which are operable for stabilizing clay and other fine particles in the formation to be treated. Preferably the clay stabilization agent is polymeric structure that is absorbed on water sensitive clays as ions connected by a chain-like linkage structure. Such ion-linking clay stabilization agents are preferred over agents which are absorbed on cation exchange sites as separate or single ions.

Initially the core of the experiment represented by FIG. 4 was heated to 68° C. (154° F.) and maintained under a pressure of 35 kg/sq cm (550 psig) and then subjected to the following stabilizing-acidizing sequential steps. First the core was treated with a quaternary amine stabilization agent, hereinafter referred to as "QASA,"—NH$_4$Cl solution, or QASA/NH$_4$Cl solution, to stabilize the clays and other fine particle components of the core. The core was then acidized with a 5% hydrochloric acid solution which preferably contains a corrosion inhibitor, which was followed by restabilization with QASA/NH$_4$Cl solution. Next the core was then treated with a 0.2M sodium fluotitanate, 0.15M ammonium citrate or (NH$_4$)$_2$HC$_6$H$_5$O$_7$ acidizing solution at 68° C. (154 °F.) and 35 kg/sq. cm (500 psig), which was followed by a third stabilization treatment with QASA/NH$_4$Cl solution. The results as shown in FIG. 4 show an improvement in permeability from about 7.5 md after the first stabilization step to about 20 md after the third stabilization step.

EXAMPLE 2

Another Talara Zapotal core was subjected to a similar five-step sequential treatment as that shown in FIG. 4 except that the fourth step utilized a 0.1M ammonium fluotitanate/(NH$_4$)$_2$HC$_6$H$_5$O acidizing solution instead of the sodium fluotitanate solution used in Example 1. The results, presented graphically in FIG. 5, show an improvement in core permeability from about 75 md after the first stabilization step to about 220 md after the third stabilization step.

EXAMPLE 3

The permeability of a core sample from Somatito Well 9109, having a composition similar to that of the Wyoming bentonite described above, was improved from 0.03 millidarcy (md) to 1.62 md, more than 5000%, by a seven step sequential treatment of this invention conducted at 43° C. (110° F.) and 70 kg/sq cm (1000 psig). The results are shown graphically in FIG. 6. The composition of the treating solutions used for each step and the permeability after each step were as follows:

| Step | Treating Solution | Permeability (md) |
|---|---|---|
| (1) | QASA/NH$_4$Cl | 0.03 |
| (2) | 5% HCl + 0.07% citric acid | 0.07 |
| (3) | QASA/NH$_4$Cl | 0.09 |
| (4) | 0.1 M ammonium fluotitanate, 0.15 M citric acid, 0.2 M NH$_4$Cl | 0.98 |
| (5) | QASA/NH$_4$Cl | 1.10 |
| (6) | 5% HCl + 0.07% citric acid | 1.43 |
| (7) | QASA/NH$_4$Cl | 1.62 |

EXAMPLE 4

A well having a lower than desired permeability from an isolated 9 m (30 ft.) zone or interval is subjected to a five step sequential matrix acidization process similar to that shown in FIG. 5. The sequence and injection rate are as follows:

| Step | Injected Composition |
|---|---|
| (1) | 1018 l/m (82 gal/ft) QASA/NH$_4$Cl (In a 30 ft. interval this rate corresponds to an injection of 2460 gal.) |
| (2) | 1018 l/m (82 gal/ft) 5% HCl |
| (3) | 646 l/m (52 gal/ft) 0.1 M ammonium fluotitanate solution |
| (4) | 5875 l/m (473 gal/ft) 5% HCl |
| (5) | 1018 l/m (82 gal/ft) QASA/NH$_4$Cl |

An incremental improvement of about 5350 l/day (45 bbl/day) is predicted.

EXAMPLE 5

A core from a conglomerate sandstone formation in the Mendoza Contract Area 7559 oil field in Argentina was treated in like manner to the core in Example 3 except for the following changes. The temperature was raised to 104° (220° F.) and the pore pressure was held at 127 kg/sq cm (1800 psig) with a back pressure regulator, while an overburden pressure of 155 kg/sq cm (2200 psig) was maintained hydrostatically on the core.

This test was conducted using the standard procedure of heat shrinking a Teflon (trademark) plastic sleeve over the entire cylindrical surface of the core so that the cylindrical surface of the core was sealed against the Teflon sleeve. The outside surface of the Teflon sleeve was subjected to the overburden pressure of 155 kg/sq cm. The cylindrical ends of the test core were therefore isolated from the overburden pressure in the usual manner. With the test core in the vertical position the injected solutions were forced to flow upwardly through the test core. The discharge pressure of the solution flowing out of the top of the test core was regulated to a pressure of 127 kg/sq cm. The initial permeability of the core was 2.23 md. The core was then treated with the same sequence of fluids as that of Example 3. After the final treatment, the permeability had increased to 9.11 md or about 4 fold over the initial permeability. No unconsolidation or plugging of the core occurred from the treatment by the principals of this invention.

In contrast to the excellent results described above, a similar core from the same sandstone formation treated with conventional mud acid, i.e. 3% HF/12% HCl, fell apart.

The permeability after each step, the steps are set forth in Example 3, was as follows:

| Step | Permeability (md) |
|------|-------------------|
| (1)  | 2.23 |
| (2)  | 1.95 |
| (3)  | 1.95 |
| (4)  | 4.11 |
| (5)  | 4.11 |
| (6)  | 9.11 |
| (7)  | 9.11 |

EXAMPLE 6

During experiments with treating sandstone cores with solutions of pure sodium fluotitanate, it was found that the aluminum concentration of the filtrate was quite low. To determine if this was due to the precipitation of aluminum-containing compounds such as aluminum fluoride-containing compounds, the following experiments were conducted. A sample of pure chlorite clay was ground to a powder.

Test A: Into a dish at room temperature was added 10 ml of a solution containing 0.45M sodium fluotitanate, 0.156M sodium citrate, 0.1M ammonium chloride, and 15.4 mg of the powdered chlorite clay. This was allowed to stand for 24 hours without agitation.

Test B: For comparison, 150 mg chlorite clay and 10 ml of 6M HCl were also placed in a dish and allowed to stand in the same manner as in Test A.

The mixtures from Tests A and B were filtered and the analysis of the filtrates was as follows:

| Test | Elemental Concentrations (mg/l) | | | | | | Mole Ratio Si/Al |
|------|------|------|------|------|-----|-----|------|
|      | Al   | Si   | Fe   | Ca   | Mn  | Mg  |      |
| A    | 14.9 | 39.9 | 21.2 | 69.5 | <12 | <10 | 2.58 |
| B    | 3.8  | 12.1 | 15.2 | 8.55 | <12 | <10 | 3.07 |

Not all the chlorite dissolved in either Test A or B. The solids remaining after treating were examined with x-ray diffraction and showed evidence for only the starting materials, chlorite clay, and in the case of Test A sodium fluotitanate resulting from the evaporation of the solution after filtering.

No precipitation of aluminum-containing compounds, or any other compounds, was observed in Test A. These tests show that the citrate ion effectively held aluminum ions in the fluotitanate solution thereby preventing precipitation of reaction products which can reduce the permeability of formations when acidized.

In one embodiment the formulation of the clay stabilization agent/ammonium chloride solution or the QA-SA/NH4Cl solution is from about 0.005 to about 2% by volume clay stabilization agent or QASA and from about 0.5 to about 4% by weight ammonium chloride. The percentage of stabilizer and ammonium chloride will vary depending on the amount of clay in the formation to be treated. Various formulations and uses of QASA is described in Halliburton's publication F-3183 (Revised) which hereby is incorporated herein by reference.

Unless otherwise specified, the preferred formulation of the QASA/NH4Cl solution referred to above is as follows:

0.75% by volume QASA
2% by weight NH4Cl

In each of the above examples it is preferable that the various hydrochloric acid solutions contain a corrosion inhibitor to protect the piping and tubing of the well and injection system. Any commercially available corrosion inhibitors can be used for this purpose by mixing such inhibitors with HCl containing solutions. Examples of such corrosion inhibitors are Halliburton's inhibitors sold under the trademarks "HAI50," "HAI65" and "HAI75" which are described in Halliburton's publications CS-5073 and CS-5136 which are incorporated herein by reference and Dowell's inhibitor sold under the trademark A200 which is described in the Dowell Stimulation Materials Manual, acidizing-Sec. I-D-1, pages 1 and 2, December, 1981, which is incorporated herein by reference.

Unless otherwise specified, all percentages referred to are by weight.

It is understood that the foregoing detailed description and embodiments shown in the Figures and presented in the Examples are illustrative of the principles of this invention. Other alternatives can be employed. For example, other sequential injection steps can be employed and various other fluids can be used for specific reasons such as stabilizers, removing skin damage adjacent the wellbore, dissolving calcareous materials, causing viscosity increase or thickening, inhibiting corrosion, preventing sludge formation and/or reducing friction. Accordingly the present invention is not limited to that shown and described in the Examples and Figures.

What is claimed is:

1. A process for slowly dissolving siliceous material comprising:
   (a) providing an aqueous composition comprising
       i. water, and
       ii. a first substance selected from the group consisting of hexafluorotitanate-containing compounds, and mixtures thereof which are operable for producing, without the presence of an acid in said aqueous composition other than hydrofluoric acid, hydrofluoric acid which is generated by reaction of hexafluorotitanate anions with said water, wherein the concentration of said first substance in said aqueous composition is from about 0.0001 molar to the solubility limit of said first substance in said water; and (b) contacting siliceous material with an effective amount of said aqueous composition to slowly dissolve said siliceous material.

2. The process of claim 1, wherein said siliceous material is contained in a subterranean formation.

3. The process of claim 1, wherein said siliceous material is clay mineral matter in a subterranean formation.

4. The process of claim 1, wherein said first substance is selected from the group consisting of ammonium fluotitanate, sodium fluotitanate, and mixtures thereof.

5. The process of claim 1, wherein the concentration of said first substance used to form said aqueous composition is from about 0.01 to about 1.3 molar.

6. The process of claim 1, wherein the concentration of said first substance used to form said aqueous composition is from about 0.05 to about 0.75 molar.

7. The process of claim 1, wherein the pH of said aqueous solution is at least about 2.2.

8. The process of claim 1, wherein the pH of said aqueous solution is from about 2.2 to about 3.8.

9. The process of claim 1, wherein said aqueous composition provided in step (a) also comprises from about 0.01 to about 1 molar concentration of citrate ion.

10. The process of claim 1, wherein the concentration of said first substance used to form said aqueous composition is from about 0.05 to about 0.75 molar.

11. The process of claim 1, wherein the concentration of said first substance used to form said aqueous composition is from about 0.1 to about 0.5 molar.

12. The process of claim 1, wherein said aqueous composition provided in step (a) also comprises from about 0.05 to about 0.5 molar concentration of citrate ion.

13. The process of claim 1, wherein said aqueous composition provided in step (a) also comprises from about 0.01 to about 0.2 molar concentration of citrate ion.

14. The process of claim 1, further comprising contacting said siliceous material with an aqueous solution comprising a sequestering agent prior to contacting said siliceous material with said aqueous composition in step (b).

15. A process for increasing the permeability of siliceous material having a clay component comprising:
(a) contacting said siliceous material with a clay stabilization agent/ammonium chloride aqueous mixture, said clay stabilization agent being operative to stabilize mineral matter containing ion exchange sites;
(b) after said contacting with said clay stabilization agent in step (a), contacting said siliceous material with a hydrochloric acid solution having a HCl concentration about 2 to about 5%;
(c) after said contacting with said hydrochloric acid solution in step (b), contacting said siliceous material with a clay stabilization agent/ammonium chloride aqueous mixture, said clay stabilization agent being operative to stabilize mineral matter containing ion exchange sites;
(d) after said contacting with a clay stabilization agent in step (c), contacting said siliceous material with an effective amount of an aqueous composition comprising (i.) water, and (ii.) a first substance selected from the group consisting of hexafluorotitanate-containing compounds, and mixtures thereof which are operable for producing, without the presence of an acid in said aqueous composition other than hydrofluoric acid, hydrofluoric acid which is generated by reaction of hexafluorotitanate anions with said water, wherein the concentration of said first substance in said aqueous composition is from about 0.0001 molar to the solubility limit of said first substance in said water, to slowly dissolve a part of said siliceous material and increase the permeability thereof.

16. The process of claim 15, further comprising:
(e) after said contacting with said aqueous composition in step (d), contacting said siliceous material with a clay stabilization agent/ammonium chloride aqueous mixture, said clay stabilization agent being operative to stabilize mineral matter containing ion exchange sites.

17. The process of claim 15, wherein said hydrochloric acid solution used to contact said siliceous material in step (b) also comprises a citrate ion concentration of from about 0.001 molar to about 0.05 molar.

18. The process of claim 15, wherein the concentration of said first substance in said aqueous composition of step (d) is from about 0.01 to about 1.3 molar.

19. The process of claim 15, wherein said aqueous composition of step (d) also comprises from about 0.01 molar to about 1 molar concentration of citrate ion.

20. A process for increasing the permeability of a subterranean formation having siliceous clay in said formation which causes said formation to have an initial permeability lower than desired, said process comprising:
(a) providing an aqueous acidizing composition which slowly produces hydrofluoric acid comprising
 i. water, and
 ii. a first substance selected from the group consisting of ammonium fluotitanate, sodium fluotitanate, and mixtures thereof, which are operable for slowly producing, without the presence of an acid in said aqueous acidizing composition other than hydrofluoric acid, hydrofluoric acid which is generated by slowly hydrolyzing hexafluorotitanate anions formed from said first substance in said water, wherein the concentration of said first substance in said aqueous composition is from about 0.0001 molar to the solubility limit of said first substance in said water; and
(b) contacting said subterranean formation with an effective amount of said aqueous acidizing composition to slow dissolve siliceous clay in said formation to increase the permeability of said formation to a value greater than said initial permeability.

21. The process of claim 20 wherein said aqueous acidizing composition provided in step (a) also comprises from about 0.01 to about 1 molar concentration of citrate ion.

22. A process for increasing the permeability of a subterranean formation having siliceous clay in said formation which causes said formation to have an initial permeability lower than desired, said process comprising:
(a) providing an aqueous acidizing composition which slowly produces hydrofluoric acid comprising
 i. water,
 ii. a first substance selected from the group consisting of ammonium fluotitanate, sodium fluotitanate, and mixtures thereof, which are operable for slowly producing, without the presence of an acid in said aqueous acidizing composition other than hydrofluoric acid, hydrofluoric acid which is generated by the slow reaction of hexafluorotitanate anions formed from said first substance with said water, wherein the concentration of said first substance in said aqueous composition is from about 0.01 to about 1.3 molar, and iii. a citrate ion concentration of from about 0.01 to about 1 molar; and (b) contacting said subterranean formation with an effective amount of said aqueous acidizing composition to sowly dissolve siliceous clay in said formation to increase the permeability of said formation to a value substantially greater than said initial permeability.

23. The process of claim 22, wherein said citrate ion concentration is formed from a second substance selected from the group consisting of ammonium citrate, sodium citrate, citric acid and mixtures thereof.

24. The process of claim 22, wherein said subterranean formation comprises chlorite clays.

25. An acidizing composition comprising:
i. water,
ii. a first substance selected from the group consisting of hexafluorotitanate-containing compounds, and mixtures thereof which are operable for producing, without the presence of an acid in said aqueous composition other than hydrofluoric acid, hydrofluoric acid generated by reaction of hexafluorotitanate anions with said water, wherein the concentration of said first substance in said aqueous composition is from about 0.0001 molar to the solubility limit of said first substance in said water, and
iii. from about 0.01 to about 1 molar concentration of citrate ion.

26. An acidizing composition comprising:
i. water,
ii. a first substance selected from the group consisting of ammonium fluotitanate, sodium fluotitanate, and mixtures thereof which are operable for producing, without the presence of an acid in said aqueous composition other than hydrofluoric acid, hydrofluoric acid generated by reaction of hexafluorotitanate anions with said water, wherein the concentration of said first substance in said aqueous composition is from about 0.0001 molar to the solubility limit of said first substance in said water, and
iii. a second substance selected from the group consisting of ammonium citrate, sodium citrate, citric acid and mixtures thereof, wherein the concentration of said second substance is from about 0.01 to about 1 molar.

27. The composition of claim 26, wherein the concentration of said first substance is from about 0.01 to about 1.3 molar, and the concentration of said second substance is from about 0.05 to about 0.5 molar.

* * * * *